US010448360B2

(12) United States Patent
Tenny et al.

(10) Patent No.: US 10,448,360 B2
(45) Date of Patent: Oct. 15, 2019

(54) SCHEDULING OF PAGING NOTIFICATIONS SUPPORTING BEAM SWEEPING

(71) Applicant: Futurewei Technologies, Inc., Plano, TX (US)

(72) Inventors: Nathan Edward Tenny, Poway, CA (US); Richard Stirling-Gallacher, San Diego, CA (US); Bin Liu, San Diego, CA (US); Yunsong Yang, San Diego, CA (US)

(73) Assignee: Futurewei Technologies, Inc., Plano, TX (US)

( * ) Notice: Subject to any disclaimer, the term of this patent is extended or adjusted under 35 U.S.C. 154(b) by 0 days.

(21) Appl. No.: 16/040,211

(22) Filed: Jul. 19, 2018

(65) Prior Publication Data

US 2018/0324758 A1 Nov. 8, 2018

Related U.S. Application Data

(63) Continuation of application No. 15/376,379, filed on Dec. 12, 2016, now Pat. No. 10,057,881.
(Continued)

(51) Int. Cl.
*H04W 68/00* (2009.01)
*H04W 68/02* (2009.01)
*H04W 16/28* (2009.01)

(52) U.S. Cl.
CPC ........... *H04W 68/02* (2013.01); *H04W 16/28* (2013.01); *H04W 68/005* (2013.01); *H04W 68/025* (2013.01)

(58) Field of Classification Search
None
See application file for complete search history.

(56) References Cited

U.S. PATENT DOCUMENTS

| 6,141,335 A | 10/2000 | Kuwahara et al. |
| 2008/0146253 A1 | 6/2008 | Wentink |

(Continued)

FOREIGN PATENT DOCUMENTS

| EP | 2119280 A2 | 11/2009 |
| WO | 2008008688 A1 | 1/2008 |
| WO | 2013162953 A1 | 10/2013 |

OTHER PUBLICATIONS

3GPP TS 25.304, "3rd Generation Partnership Project; Technical Specification Group Radio Access Network; User Equipment (UE) Procedures in Idle Mode and Procedures for Cell Reselection in Connected Mode", (Release 1999), 2004, vol. 3.14.0, pp. 1-41.
(Continued)

*Primary Examiner* — German Viana Di Prisco
(74) *Attorney, Agent, or Firm* — Slater Matsil, LLP

(57) ABSTRACT

A paging method is disclosed. In an embodiment a method for paging monitoring implemented by a user equipment (UE) includes hashing an identity of the UE to determine a paging frame in which a page is to be sent to the UE and to determine a position of an indicator in a bitmap to be sent to the UE, wherein a value of the indicator indicates whether a page message associated with a paging group to which the UE belongs is transmitted in a current paging cycle, selecting a first downlink beamformed beam from a plurality of beams within the determined paging frame, receiving the bitmap from the first downlink beam and determining that the value of the indicator indicates that the page message is transmitted in the current paging cycle and, based thereon, receiving and decoding the page message to determine whether the UE is being paged.

20 Claims, 10 Drawing Sheets

Related U.S. Application Data

(60) Provisional application No. 62/395,171, filed on Sep. 15, 2016.

(56) References Cited

U.S. PATENT DOCUMENTS

| | | | |
|---|---|---|---|
| 2008/0182596 | A1 | 7/2008 | Wang et al. |
| 2010/0202382 | A1 | 8/2010 | Park et al. |
| 2014/0128109 | A1 | 5/2014 | Li et al. |
| 2016/0119895 | A1 | 4/2016 | Agiwal et al. |
| 2017/0111886 | A1 | 4/2017 | Kim et al. |
| 2017/0339675 | A1* | 11/2017 | Liu ................... H04L 5/0051 |
| 2017/0367069 | A1* | 12/2017 | Agiwal .............. H04W 68/02 |
| 2018/0014208 | A1* | 1/2018 | Guo .................. H04W 16/28 |

OTHER PUBLICATIONS

3GPP TS 36.304, "3rd Generation Partnership Project; Technical Specification Group Radio Access Network; Evolved Universal Terrestrial Radio Access (E-UTRA); User Equipment (UE) Procedures in Idle Mode", (Release 8), 2011, vol. 8.10.0, pp. 1-30.

Cai, et al., "Mitigating DoS Attacks on the Paging Channel by Efficient Encoding in Page Messages", In Security and Privacy in Communication Networks: 5th International ICST Conference, SecureComm 2009, Revised Selected Papers, Sep. 14-18, 2009.

Mutaf, et al., "Hash-Based Paging and Location Update Using Bloom Filters: A Paging Algorithm That is Best Suitable for IPv6", Mobile Networks and Applications, 2004, vol. 9, pp. 627-631.

"3rd Generation Partnership Project; Technical Specification Group Radio Access Network; User Equipment (UE) procedures in idle mode and procedures for cell reselection in connected mode (Release 13)", 3GPP TS 25.304 V13.0.0 (Dec. 2015), 58 pages.

Nokia, Alcatel-Lucent Shanghai Bell, "On beam sweeping and its implications", 3GPP TSG-RAN WG2 Meeting #94, R2-163443, 9.5.1, May 23-27, 2016, Nanjing, China, 4 pages.

Samsung, "Discussion on paging in NR-Multi-beam aspects", 3GPP TSG RAN WG1 Meeting #86, R1-166790, 8.1.5, Aug. 22-26, 2016, Gothenburg, Sweden, 4 pages.

Nokia et al., "Paging in NR at HF operation", 3GPP TSG-RAN WG2 Meeting #95, R2-164753, 9.4.3.4, Aug. 22-26, 2016, Gothenburg, Sweden, 6 pages.

* cited by examiner

SCHEDULING OF PAGING NOTIFICATIONS SUPPORTING BEAM SWEEPING

CROSS-REFERENCE TO RELATED APPLICATIONS

This application is a continuation of U.S. patent application Ser. No. 15/376,379, filed on Dec. 12, 2016, which claims the benefit of U.S. Provisional Application No. 62/395,171, filed on Sep. 15, 2016, which applications are hereby incorporated herein by reference.

TECHNICAL FIELD

The present invention relates generally to a system and method for wireless communications, and, in particular embodiments, to a system and method for the scheduling of paging notifications supporting beam sweeping.

BACKGROUND

A user equipment (UE) may enter a low-power idle state when no data communication with a network is occurring. When the network wishes to communicate with an idle UE, the network may send a page to the UE. Pages are typically transmitted only on paging occasions that occur at periodic intervals known to both the UE and the network. When a paging occasion occurs, the UE wakes momentarily to determine if the network has sent a page. If no page has been sent, the UE may return to the idle state. If a page has been sent, the UE may listen for a page message corresponding to the page and may follow instructions contained in the page message, such as instructions to initiate procedures to connect to the network.

SUMMARY

In accordance with an embodiment of the present invention, a method for paging notification comprises hashing an identity of a UE to determine a paging frame in which a page is to be sent to the UE and to determine an index of an entry in a bitmap, setting the entry at the index in the bitmap to a value indicating whether a page message associated with a paging group to which the UE belongs is transmitted in a current paging cycle, and transmitting the bitmap in each of a plurality of beamformed beams, wherein the beams are transmitted in a sweeping pattern such that at least one beam is transmitted in every portion of a coverage area of a component transmitting the beams and such that each of the beams is transmitted at least once during the paging frame.

In accordance with another embodiment of the present invention, a method for paging monitoring comprises hashing an identity of a UE to determine a paging frame in which a page is to be sent to the UE and to determine a position of an indicator in a bitmap to be sent to the UE, wherein a value of the indicator indicates whether a page message associated with a paging group to which the UE belongs is transmitted in a current paging cycle, identifying a beamformed beam within the paging frame in which the UE is capable of receiving a downlink transmission, monitoring the beam during the paging frame to receive the bitmap, and when the value of the indicator indicates that the page message is transmitted in the current paging cycle, receiving and decoding the page message to determine whether the UE is being paged.

In accordance with another embodiment of the present invention, a transmit/receive point comprises a processor and a non-transitory computer readable storage medium storing programming for execution by the processor. The programming includes instructions to hash an identity of a UE to determine a paging frame in which a page is to be sent to the UE and to determine an index of an entry in a bitmap, set the entry at the index in the bitmap to a value indicating whether a page message associated with a paging group to which the UE belongs is transmitted in a current paging cycle, and transmit the bitmap in each of a plurality of beamformed beams, wherein the beams are transmitted in a sweeping pattern such that at least one beam is transmitted in every portion of a coverage area of a component transmitting the beams and such that each of the beams is transmitted at least once during the paging frame.

In accordance with another embodiment of the present invention, a UE comprises a processor and a non-transitory computer readable storage medium storing programming for execution by the processor. The programming includes instructions to hash an identity of the UE to determine a paging frame in which a page is to be sent to the UE and to determine a position of an indicator in a bitmap to be sent to the UE, wherein a value of the indicator indicates whether a page message associated with a paging group to which the UE belongs is transmitted in a current paging cycle, identify a beamformed beam within the paging frame in which the UE is capable of receiving a downlink transmission, monitor the beam during the paging frame to receive the bitmap, and when the value of the indicator indicates that the page message is transmitted in the current paging cycle, receive and decode the page message to determine whether the UE is being paged.

An advantage of one or more embodiments derives from the fact that paging will be a major function in future versions of Radio Resource Control (RRC) signaling. A single set of RRC procedures to cover both low frequency (omnidirectional) cases and high frequency and other beamformed cases may be specified, so the future paging procedures may need to be adaptable to beamforming even in omnidirectional cases. The paging algorithm may need to be specified because the UE and network need a common awareness of when the UE will be monitoring paging. One or more embodiments disclosed herein provide paging behavior that may be implemented in such situations.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF ILLUSTRATIVE EMBODIMENTS

The structure, manufacture and use of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

In Long Term Evolution (LTE) systems, paging occasions are multiplexed at both the paging frame level and the paging subframe level, where a frame occupies 10 milliseconds (ms) and a subframe occupies 1 ms. A UE uses its identifier (such as its International Mobile Subscriber Identity (IMSI)) as an input into a hash function to determine which paging frames, and which subframes within the paging frames, to monitor for receiving paging notification. The hash functions are modulus based and given by the following equation, $$\text{SFN mod } T = (T \text{ div } N)*(\text{UE\_ID mod } N)$$

where SFN is the system frame number; T is the DRX (discontinuous reception) cycle of the UE; nB is 4 T, 2 T, T, T/2, T/4, T/8, T/16, T/32; N is min(T,nB); Ns is max(1,nB/T); and UE_ID is IMSI mod 1024.

An index i_s pointing to a paging occasion may be derived from following equation.

$$i\_s = \text{floor}(\text{UE\_ID}/N) \text{mod } Ns$$

The index i_s determines the paging occasion subframe index via a lookup table.

When a network wishes to send a page to a UE, the network determines when to page by applying the same hash function used by the UE. Therefore, the UE and the network both know when a paging occasion will occur for that UE, and the UE may listen for a page in the physical downlink control channel (PDCCH) only in the assigned paging occasion.

Different UEs may hash to the same paging occasion, so false alarms may occur. That is, a UE may receive a page intended for another UE. The hash function distributes UEs to different paging occasions to reduce the number of false alarms, but it may not be possible to reduce the number to zero. Thus, when a UE sees a page scheduled on the PDCCH in a paging occasion assigned to itself, the UE may need to check the corresponding page message on the physical downlink shared channel (PDSCH) to determine if the page is actually assigned to itself. UEs that hash to the same paging occasion may be referred to as a paging group.

One paging subframe contains one bit of paging information on the PDCCH. The bit indicates whether one or more UEs in the group assigned to the paging occasion are or are not currently being paged. Additional information, such as which individual UE is being paged and why, may be transmitted in the PDSCH. One paging frame contains Ns bits (up to four bits, the value depending on the network configuration) of information on the PDCCH.

Figure 1:
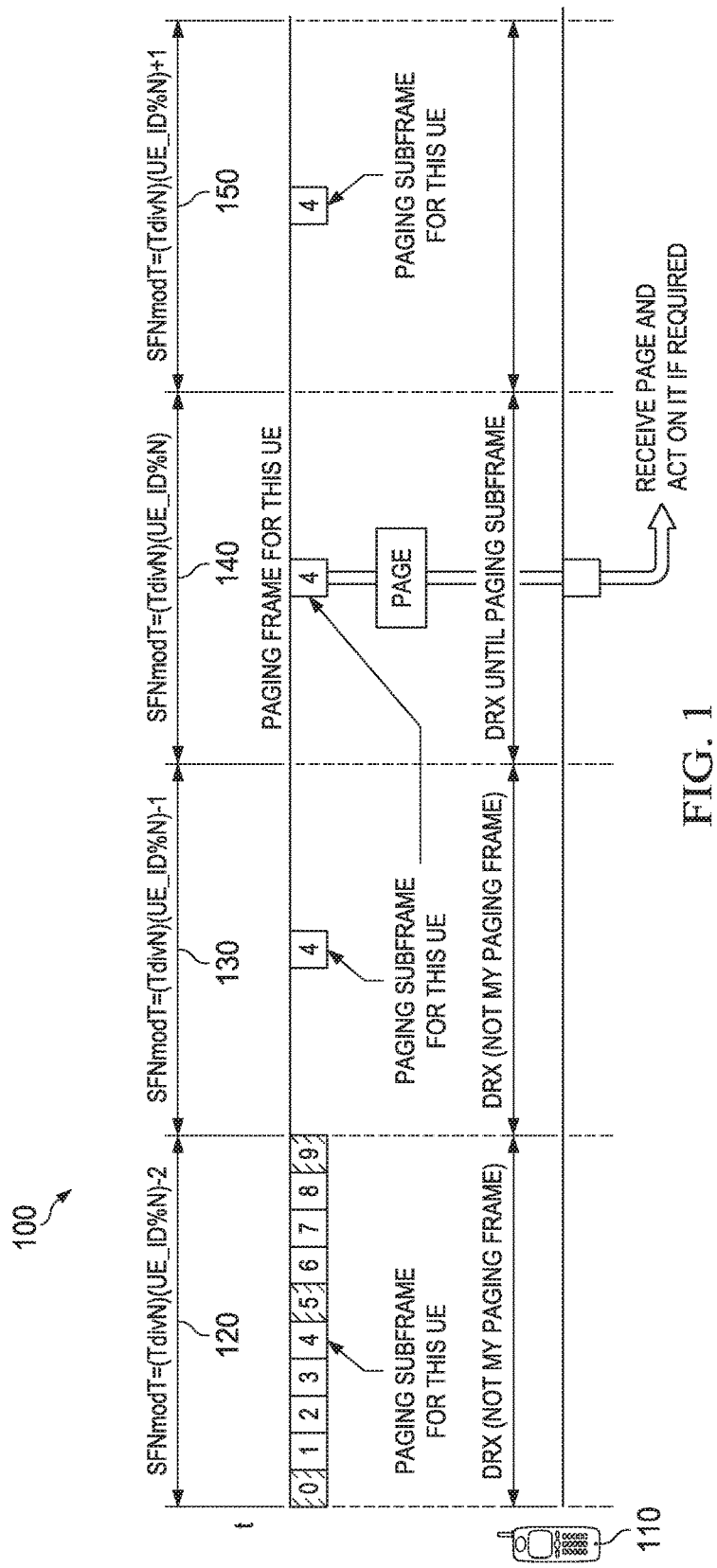
FIG. 1 is a timeline illustrating a paging procedure.

FIG. 1 is a timeline 100 illustrating a paging procedure. In this example, a UE 110 has hashed its identifier (ID) and determined that paging frame 140 is its paging frame and subframe 4 is its paging subframe. When paging frames 120 and 130 occur, the UE no recognizes that neither of those paging frames is its paging frame, and the UE no remains in a DRX off-period throughout those paging frames. When paging frame 140 occurs, the UE no recognizes that paging frame is its paging frame. The UE no remains in the DRX off-period until the UE's paging subframe, subframe 4, occurs. When subframe 4 occurs, the UE no wakes up, receives a page, and acts on the page if required to do so. At the next paging subframe within paging frame 140, the UE no returns to the DRX off-period. When paging frame 150 occurs, the UE no again recognizes that paging frame is not its paging frame, and the UE no remains in the DRX off-period.

Some systems may use beam sweeping for broadcast transmissions, including paging. That is, if a transmit/receive point (TRP) cannot achieve the needed range when transmitting omnidirectionally, the TRP may rely on beamforming to direct transmissions in one or more specific directions. However, a TRP typically cannot beamform in all directions at once, so the TRP may sweep multiple beamformed transmissions through multiple directions over time.

Figure 2:
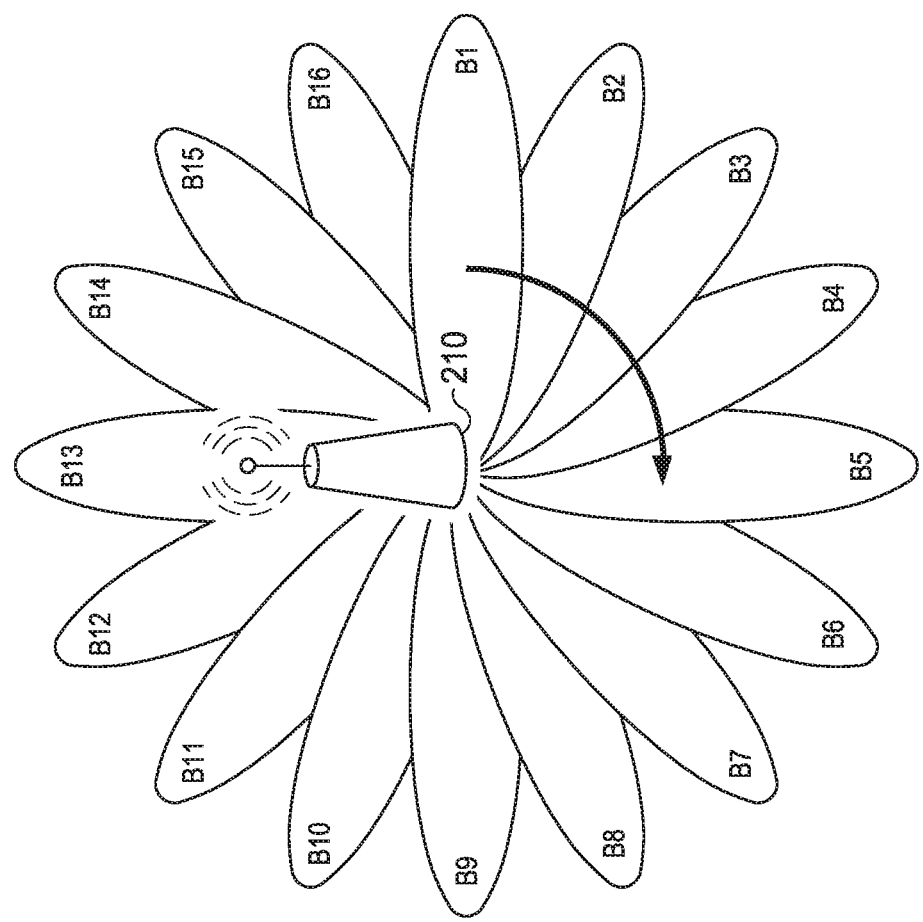
FIG. 2 is a diagram illustrating sweeping of multiple beamformed transmissions over time.

FIG. 2 illustrates such sweeping of multiple beamformed transmissions over time. In this example, a pattern of 16 beams covers a full revolution of 2π. In other cases, the number of beams and the width of the beams may be larger or smaller. At a first time, a TRP 210 transmits a first beam, B1, in a first direction. At a second time, the TRP 210 transmits a second beam, B2, in a second direction with a defined offset from the first direction. Such transmissions continue such that the TRP 210 sends beams throughout its coverage area. Thus, the TRP 210 effectively transmits omnidirectionally over time, but at any one instant, the TRP 210 transmits in only one of the 16 directions shown. In general, the TRP 210 transmits a plurality of beamformed beams in a sweeping pattern such that at least one beam is transmitted in every portion of the coverage area of the TRP 210. The TRP 210 may be a base station, an evolved node B (eNB), or a similar component.

In order to carry a page message, a beam may need to "dwell" in one direction for at least the length of a paging occasion. This length of time may be referred to as "dwell time" D. So for a number N of beams transmitted individually, the time to sweep through an entire revolution is DN. If the TRP can transmit k beams simultaneously, however, the sweep time is DN/k. It may be assumed that D is an integer multiple m of the length p of a paging occasion, such that D=mp.

In LTE, p is 1 subframe, but with the flexible new radio (NR) structure, p may have other lengths. Hereinafter, p may be referred to as the paging transmission time interval (TTI). Thus, the beams sweep through the entire TRP coverage area, spending m paging TTIs in each beam direction. In mN/k paging TTIs, the beams cover every direction.

Problems may arise when the existing paging structure is used in a beam sweeping environment. For example, the TRP may not know the direction in which the UE is located and so may need to page omnidirectionally or almost omnidirectionally. That is, the TRP may need to sweep through a significant portion of an entire revolution, sending a page in every beam, until a page is sent to the UE for which the page is intended. Paging may be delayed in such a scenario. Also, the UE may not know when the TRP will be paging in the direction of the UE. Thus, the UE may need to stay awake longer than would otherwise be necessary and wait for a beam that carries its paging to be transmitted in the direction of the UE. The UE's battery usage may be adversely affected in such a scenario.

Figure 3:
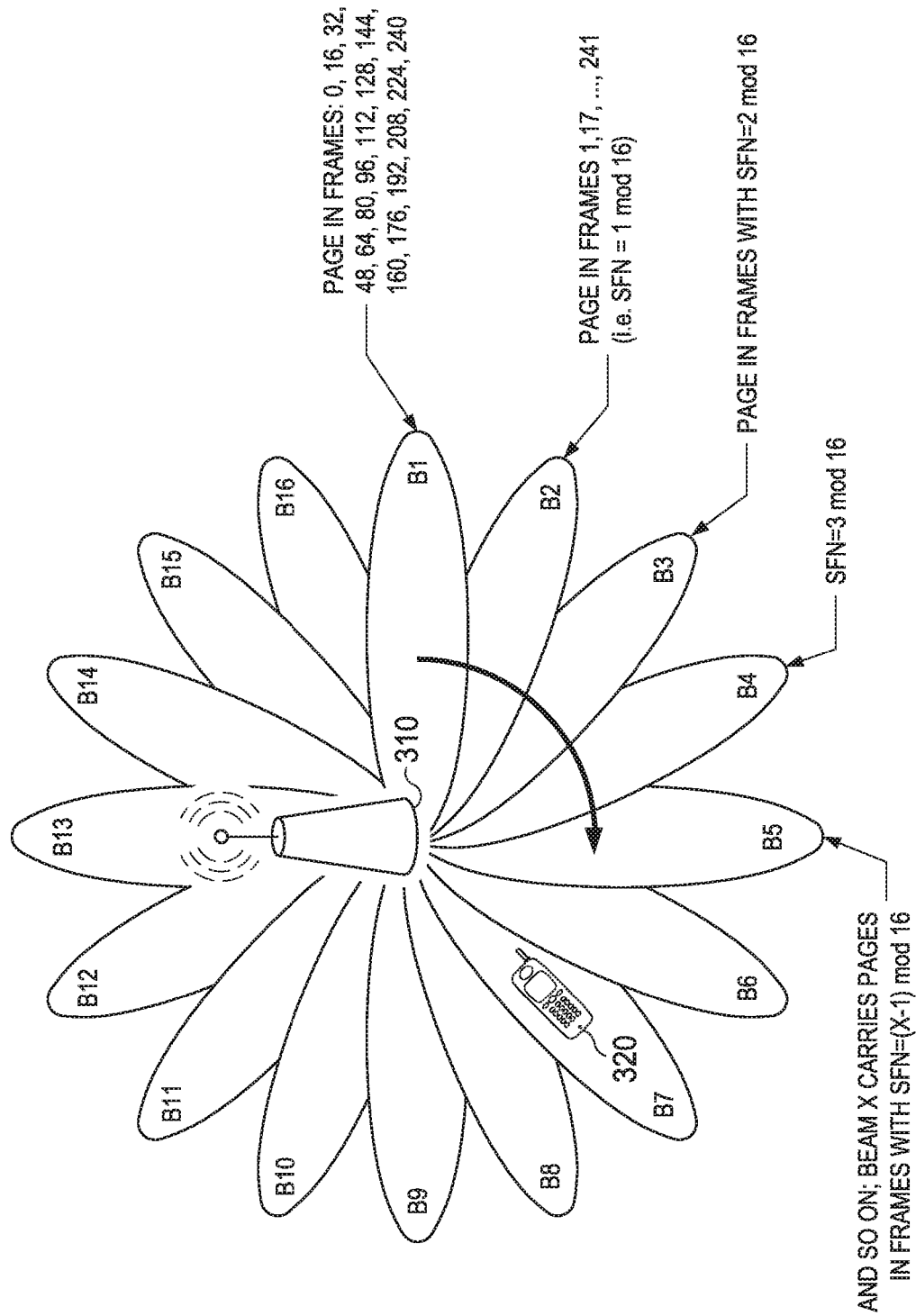
FIG. 3 is a diagram illustrating paging during the sweeping of multiple beamformed transmissions over time.

FIG. 3 illustrates another problem that may arise when the existing paging structure is used in a beam sweeping environment. In this case, the UE may never receive a page. As an example, a TRP 310 sweeps one beam at a time, for one paging frame at a time. Every 16 frames (160 ms with LTE numerology), the TRP 310 covers the entire footprint of the TRP's coverage area. A UE 320 is located in the direction of beam B7. It may be assumed that the UE 320 has a paging DRX cycle of 256 frames (2.56 seconds) and that the UE 320 hashes to paging frame 105 and paging subframe 4. The UE 320 in beam B7 will see pages only when SFN=6 mod 16. Since frame 105 does not meet that criterion, the UE 320 will never be paged in beam B7. The UE 320 is paged in beam B10 instead, but since the UE 320 is not located in the direction of beam B10, the UE is unreachable by page messages. The problem in general is that the sweep time (16 frames) divides the DRX cycle length (256 frames) evenly, so a given frame within the DRX cycle always occurs in the same beam direction.

A possible solution to the latter problem may be to have the DRX cycle and the sweep time be relatively prime. For example, the DRX cycle may be set to 233 frames or some other arbitrarily chosen prime number fairly close to 256.

Figure 4:
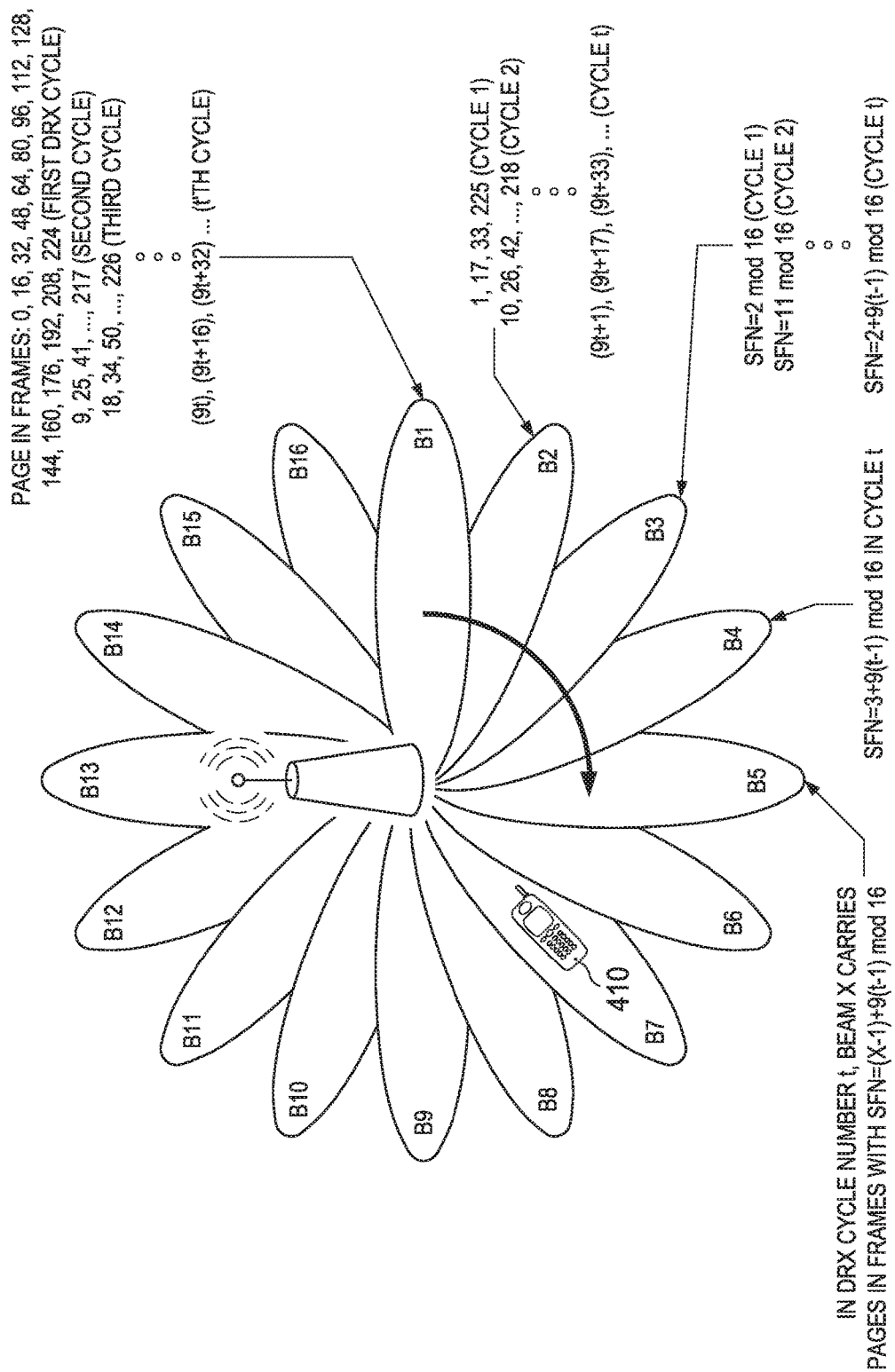
FIG. 4 is a diagram illustrating paging during the sweeping of multiple beamformed transmissions over time in a scenario where a DRX cycle and a sweep time are relatively prime.

FIG. 4 illustrates paging in such a scenario. 233=9 mod 16, so the paging cycle "shifts" by 9 in each sweep time. In DRX cycle t, beam X carries pages in frames with SFN=$(X-1)+9(t-1)$ mod 16. Thus, a determination may need to be made of when beam B7 carries a page for a frame with SFN=105 mod 256. Since 105=9 mod 16, such an event happens in cycle t such that $9=6+9(t-1)$ mod 16, or equivalently $4=3$ t mod 16. The general form is (DRX cycle)=$(X-1)$+(DRX cycle)$(t-1)$ mod $N$.

Thus, such an event first happens when t=12. In other words, it takes 12*233=2796 frames or approximately 28 seconds to page the UE 410. Such a long paging time is unacceptable, so this strategy is not desirable.

Before paging, a TRP does not know the direction in which a UE is located. The UE does know the beam pattern from system information, including its timing relationship based on the synchronization beams. So the UE may choose to listen only when its most favorable beam is active. A UE's most favorable beam may be defined as a beam received by the UE with a measure of signal quality (e.g., received energy, signal to noise ratio, reference signal received power (RSRP), reference signal received quality (RSRQ), etc.) higher than any other beam and in a direction closer to the UE than any other beam. Any beam transmitted with an energy and a direction that allow a UE to receive a page in the beam may be considered an acceptable beam for that UE. That is, an acceptable beam is a beam that exceeds a threshold for signal quality (e.g., received energy, signal to noise ratio, RSRP, RSRQ, etc.) received by a UE, but that may or may not be the most favorable beam for the UE.

Both the network and the UE know the paging cycle and other parameters that control when the UE will be paged. However, the network does not necessarily know which beam or beams a particular UE can or will monitor. Thus, it may be desirable to define a paging scheme such that, in any paging frame, a paging occasion is sent to the listening UEs, no matter which beam is directed toward the UEs. If such a scheme were implemented, a UE would be able to listen to any beam the UE could hear and receive the paging information. However, in such a case, the network would need to deliver all the paging information on all beams, since the network does not know where the UEs are. Such a scheme would thus entail the network transmitting large amounts of redundant information. Furthermore, the time multiplexing scheme in existing LTE systems is not able to provide such functions.

In an embodiment, the paging frame concept from LTE is maintained, wherein the system timeline is divided into paging frames of consistent length and the frame length is configurable by the network. Further, the UE hashes to a paging frame by a method similar to that in LTE.

However, in an embodiment, instead of the use of paging subframes, a paging bitmap is provided to indicate a UE that is being paged. A variable that has an index i in the paging bitmap may be set to a value of "1" if a UE in paging group i is currently being paged. The UE may hash to a paging group by a method similar to that in LTE, e.g., based on UE_ID mod (number of paging groups).

The embodiments ensure that, during one paging frame, the paging bitmap is sent at least once in every beam, throughout the sweep pattern. The paging frame may need to be at least as long as the sweep time. The paging bitmap is transmitted in a single paging TTI, so the different paging groups are multiplexed in the frequency dimension, rather than being multiplexed in time as is the case in LTE and Universal Mobile Telecommunications System (UMTS). The UE listens to enough paging TTIs in the paging frame to receive the bitmap reliably. It may be noted that not every radio frame has to be a paging frame. Paging frames may be intermittent instead.

In an embodiment, construction of the paging bitmap may be based on the number of paging groups. A paging group may be defined, as in UMTS or LTE, as all the UEs that hash to a particular set of radio resources for paging. In LTE, the term "set of radio resources" refers to a paging frame and a paging occasion. With regard to the embodiments disclosed herein, the term "set of radio resources" refers to a paging frame and an index in a paging bitmap. There may be Ns entries in the paging bitmap, where Ns, as in LTE, is the number of paging groups within a paging frame. The range of Ns for the disclosed paging bitmap may be different than in LTE, where the range is limited to 4 because certain subframes have to be reserved as available for paging. For example, subframes 0/4/5/9 cannot be configured as multi-cast-broadcast single-frequency network (MBSFN) subframes or almost blank subframes (ABSF) in LTE. The embodiments have no such restrictions, and the paging bitmap may be dimensioned very large.

The UE's index in the paging bitmap may be computed as UE_ID mod (Ns) or a similar simple hash function. Like the hash functions used for paging in LTE, this function does not need to be a secure "trapdoor" function. The objective is to spread out the load across paging groups, not to conceal the UE's identity. Any function with a statistically flat distribution will suffice.

In the scheduling of paging bitmap transmissions, several assumptions may be made that are similar to those made in the above examples of beam sweeping. That is, it may be assumed that the TRP has a pattern covering N beam directions and that the TRP transmits k beams at a time with a dwell time D in each direction, where N is a multiple of k, D is a multiple of the paging TTI p, and sweep time=DN/ k. Further, the length F of the paging frame may be configured by the network, and F≥sweep time may be assumed.

In an embodiment, during each sweep cycle, the network configures at least one paging TTI in every beam, and the paging bitmap is sent in each paging TTI. Thus, the UE receives the paging bitmap, regardless of which beam the UE listens to. Corresponding page messages may be sent on each beam as well and may be sent in the same paging TTI as the paging bitmap or in a different paging TTI. The UE has previously hashed its ID to determine a position in the paging bitmap that the UE will examine for the value of an indicator. When the indicator is set to a particular value, the UE becomes aware that a page message associated with the paging group to which the UE belongs is transmitted in the current paging cycle. In such a case, the UE receives and decodes the page message to determine whether the UE is being paged. As in LTE, false alarms are possible, but the page message content may disambiguate which UE in the paging group is being paged. More paging groups may reduce the false alarm incidence.

Figure 5:
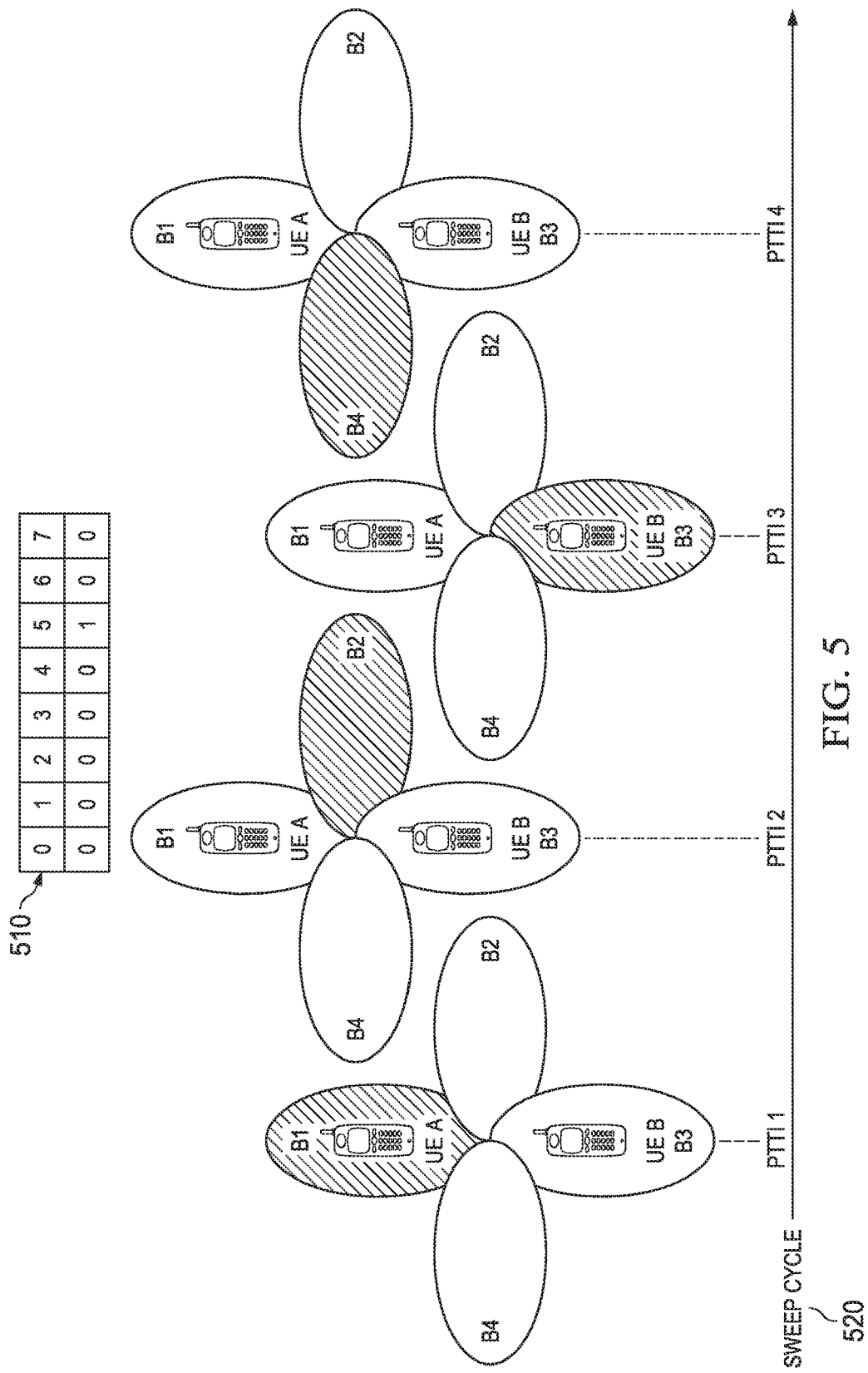
FIG. 5 illustrates an embodiment use of a paging bitmap in a beamforming and beam sweeping scenario.

FIG. 5 illustrates an embodiment use of a paging bitmap in a beamforming and beam sweeping scenario. For the sake of clarity in the drawing, only four beams are shown, but 16 beams may be present as in the previous examples or some other number of beams may be present. A paging bitmap 510 has 8 entries with indices 0-7 and corresponding values 00000100. That is, there is a value of "1" in position 5 in the paging bitmap 510 and a value of "0" in all other positions in the paging bitmap 510. A sweep cycle 520 traverses the four beams, B1-B4, one at a time, as indicated by the shading. A paging TTI is configured in each beam. UE A is located in the direction of beam B1, and UE B is located in the direction of beam B3. In this example, it may be assumed that UE A has hashed its ID and thereby determined that it will examine position 5 in the paging bitmap 510 and that UE B has hashed its ID and thereby determined that it will examine position 2 in the paging bitmap 510. In paging TTI 1, B1 sends the paging bitmap 510 in the direction of UE A. UE A looks at position 5 in the received paging bitmap 510 and sees a value of "1" at position 5 in the received paging bitmap 510. UE A thereby determines that the paging group to which UE A belongs is being paged and receives the page message. In paging TTI 3, B3 sends the paging bitmap 510 in the direction of UE B. UE B looks at position 2, sees a value of "0" in that position, determines that UE B is not being paged, and takes no action.

It may be noted that if UE B is close enough to B2, UE B may be able to receive the paging bitmap 510 in B2 instead of in B3. That is, B3 may be the most favorable beam, but B2 may be an acceptable beam. The link budget may be worse for B2, but B2 arrives at UE B earlier than B3 and may thus allow a quicker response from UE B.

A UE may need to take several steps before being able to monitor the paging channel. The UE may need to receive a paging configuration from the network, for example in system information. The UE may also need to compute hash functions for its paging frame, and in an embodiment, compute its applicable position in the paging bitmap, based on its own ID. The UE may further need to register/attach, so the core network knows the area in which the UE can be paged.

When a UE camps in the service area of a TRP that is using beamforming, the UE may identify (e.g., during the synchronization process) the most favorable downlink beam. The UE may further determine the beam pattern (e.g., from system information), so the UE knows at which times the most favorable downlink beam (or an acceptable downlink beam) will be active. In an embodiment, the UE may also determine the configuration of paging TTIs within the active period for the most favorable downlink beam (or an acceptable downlink beam). In addition, the UE may apply the paging DRX cycle. That is, the UE may stay in a DRX off-period until the UE's paging frame.

It may be noted that, because of the assumption that the paging frame duration is at least as long as the sweep pattern, it may be known that the UE's paging frame will include at least one active period for the UE's most favorable downlink beam.

During the UE's paging frame, the UE may remain in a DRX off-period until the most favorable downlink beam is transmitted. If an acceptable downlink beam is scheduled earlier than the most favorable beam, the UE may try to receive from the acceptable beam first.

While the most favorable downlink beam for a UE is active, the UE receives one or more paging TTIs since, in an embodiment, the TRP sends at least one paging TTI in every beam. In an embodiment, the number of TTIs transmitted is part of the paging configuration, while the number of TTIs the UE is specified to receive may be variable. For example, a UE in poor radio conditions may accumulate multiple paging TTIs to improve the signal-to-interference-plus-noise ratio (SINR).

Figure 6:
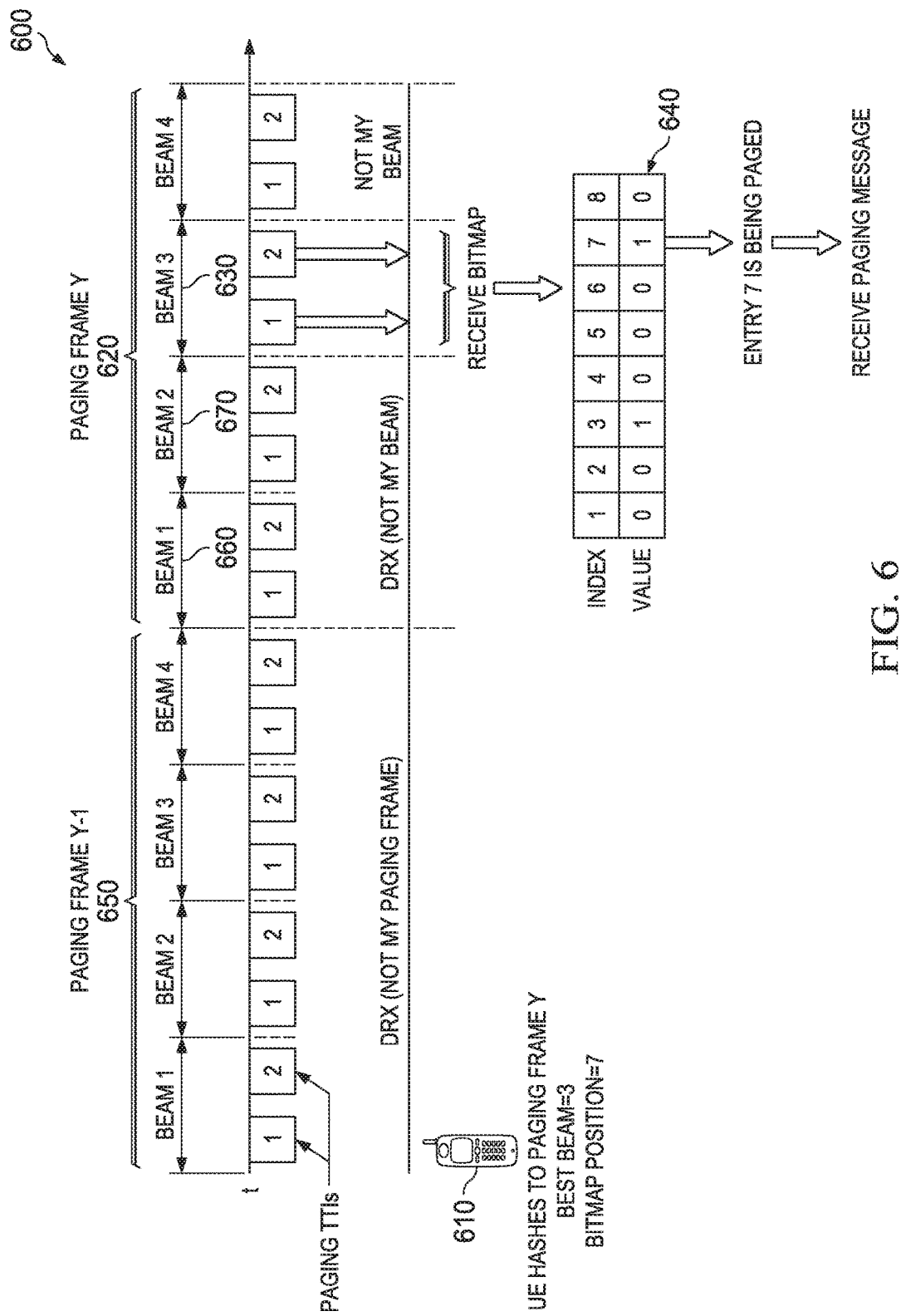
FIG. 6 illustrates an embodiment timeline of UE reception in a beamforming and beam sweeping scenario.

FIG. 6 illustrates an embodiment timeline 600 of UE reception in a beamforming and beam sweeping scenario, using the four beam example of FIG. 5. In this example, 1 paging frame=1 sweep cycle and there are two paging TTIs per beam dwell time. A UE 610 has hashed its ID and determined that paging frame Y 620 is its paging frame and that beam 3 630 is its beam in a paging frame. The UE 610 has further determined that an entry of "1" in position 7 of a paging bitmap 640 indicates that the UE 610 is in a group being paged. The UE 610 knows that paging frame Y-1 650 is not its paging frame and so remains in a DRX off-period throughout paging frame Y-1 650. The UE 610 also knows that beam 1 660 and beam 2 670 are not its beams and so remains in a DRX off-period in paging frame Y 620 until beam 3 630 is transmitted. When beam 3 630 is transmitted, the UE 610 wakes up and receives the paging bitmap 640. The UE 610 determines that an entry of "1" is present in position 7 of the received paging bitmap 640 and thus determines that the UE 610 is in a group being paged. The UE 610 may then receive a page message.

Figure 7:
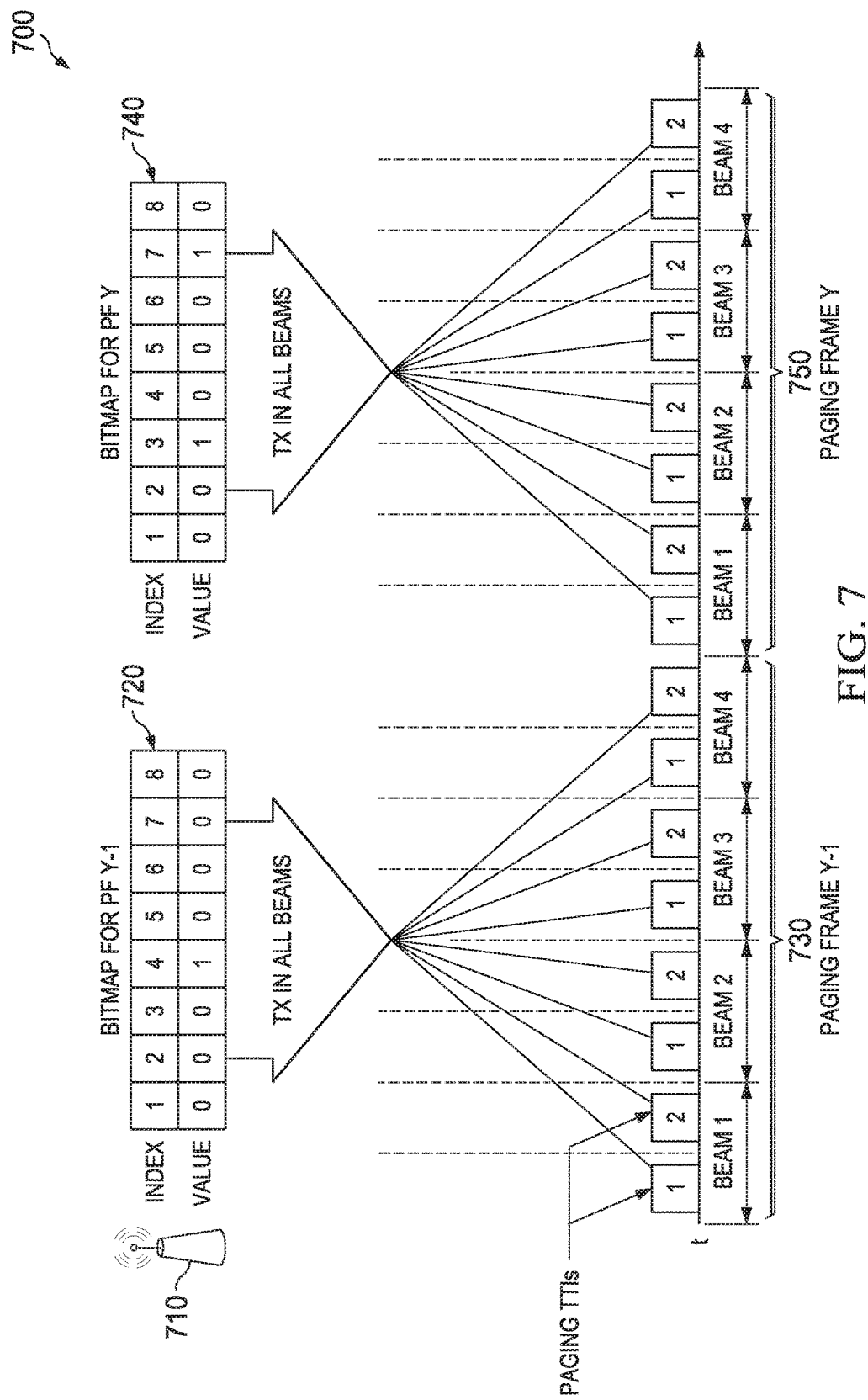
FIG. 7 illustrates an embodiment timeline of TRP transmissions in a beamforming and beam sweeping scenario.

FIG. 7 illustrates an embodiment timeline 700 of TRP transmissions in a beamforming and beam sweeping scenario, with the same paging frame and paging TTI assumptions as in FIG. 6. A TRP 710 generates pages for three UEs (not shown). The TRP 710 transmits a first paging bitmap 720 in all beams in paging frame Y-1 730. The first paging bitmap 720 has its index 4 set to "1" to indicate that a UE that has hashed to paging frame Y-1 730 and that examines the value of index 4 will receive a page in paging frame Y-1 730. The TRP 710 also transmits a second paging bitmap 740 in all beams in paging frame Y 750. The second paging bitmap 740 has its index 3 and its index 7 set to "1" to indicate that UEs that have hashed to paging frame Y 750 and that examine the value of index 3 or index 7 will receive a page in paging frame Y 750. A first UE hashes to paging frame Y-1 730 and paging bitmap index 4 and receives a page in paging frame Y-1 730. A second UE hashes to paging frame Y 750 and paging bitmap index 3 and receives a page in paging frame Y 750. A third UE, equivalent to the UE 610 of FIG. 6, hashes to paging frame Y 750 and paging bitmap index 7 and also receives a page in paging frame Y 750.

Figure 8:
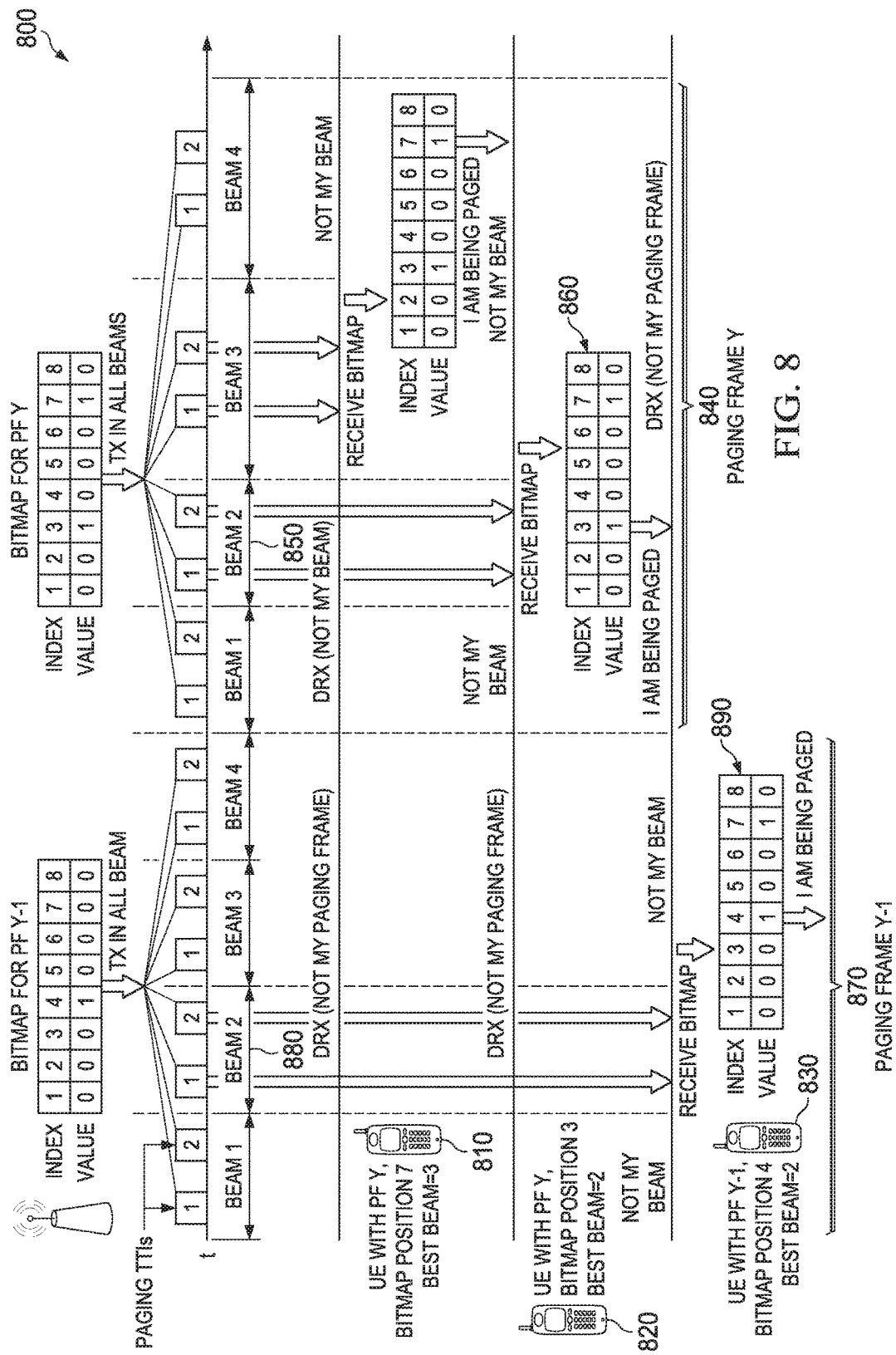
FIG. 8 illustrates an embodiment procedure combining features of FIG. 6 and FIG. 7.

FIG. 8 illustrates an embodiment procedure that combines FIG. 6 and FIG. 7. That is, the UE side of FIG. 6 and the network side of FIG. 7 are both shown, with the UE 610 of FIG. 6 as well as the other two UEs that were mentioned with regard to FIG. 7 but not shown all appearing. A first UE 810 is equivalent to UE 610 of FIG. 6 and behaves as described with regard to that figure. A second UE 820 hashes to paging frame Y 840, best beam 2 850, and paging bitmap position 3. Thus, when UE 820 receives paging bitmap 860 in beam 2 850 of paging frame Y 840, UE 820 sees that position 3 in paging bitmap 860 is set to "1" and knows that UE 820 is in a group being paged. A third UE 830 hashes to paging frame Y-1 870, best beam 2 880, and paging bitmap position 4. Thus, when UE 830 receives paging bitmap 890 in beam 2 880 of paging frame Y-1 870, UE 830 sees that position 4 in paging bitmap 890 is set to "1" and knows that UE 830 is in a group being paged.

In an embodiment, a third level of hashing is implemented to indicate a paging TTI. In such an embodiment, when the network assigns more than one paging TTI per beam (e.g., two paging TTIs per beam as in FIGS. 6-8), the UEs may compute a hash function and thereby determine to monitor only one of the TTIs. The network computes the same hash function, so the network and each UE have a paging frame, a bitmap position, and in this embodiment, a paging TTI index. This embodiment reduces the receiver duty cycle to one paging TTI per paging DRX cycle. This embodiment also spreads out the paging load, meaning there are fewer UEs in each paging group and fewer false alarms. However, the ability for UEs to combine energy from different paging TTIs may be lost. For coverage extension type scenarios, such as enhanced Machine Type Communications (eMTC)/ Narrowband Internet of Things (NB-IoT), it may be preferable to have the combining gain across multiple TTIs. For UEs in normal coverage, the benefits of spreading the paging load may be more important. In an embodiment, the use of this third level of hashing may be configurable. For example, the network may set the hashing behavior differently for a massive Internet of Things (mIoT) scenario than for an enhanced Mobile BroadBand (eMBB) scenario.

In the case of radio access network (RAN) slicing, where different portions of a RAN are used for different types of communication, implementation of this third level of hashing may entail the use of different paging configurations per slice. If one RAN serves multiple use cases, a decision may need to be made regarding which setting is more appropriate. Alternatively, separate paging channels may be used on the basis of the service and/or UE type.

From the perspective of a network, the embodiments disclosed herein provide a method of paging notification in a beamformed system. The method comprises hashing a UE identity to a paging group (i.e., a paging frame and a paging bitmap position); constructing for each paging frame a bitmap identifying which paging groups are paged in that frame; performing a beam sweeping operation such that all beams are transmitted at least once during a paging frame; and, in each beam, transmitting the bitmap on one or more paging TTIs.

From the perspective of a UE, the embodiments disclosed herein provide a method of paging monitoring in a beamformed system. The method comprises hashing the UE's identity to a paging group; identifying a preferred downlink beam (the preferred downlink beam is likely to be the UE's best downlink beam but may be any beam received with better than a minimum acceptability threshold); monitoring one or more paging TTIs within the preferred beam, during the UE's paging frame, to receive the bitmap; and determining, based on the UE's entry in the bitmap, whether the UE is being paged.

In either of the above perspectives, an optional third level of hashing provides for identifying a paging TTI within a plurality of paging TTIs based on hashing the UE's identity to a paging TTI index.

Figure 9:
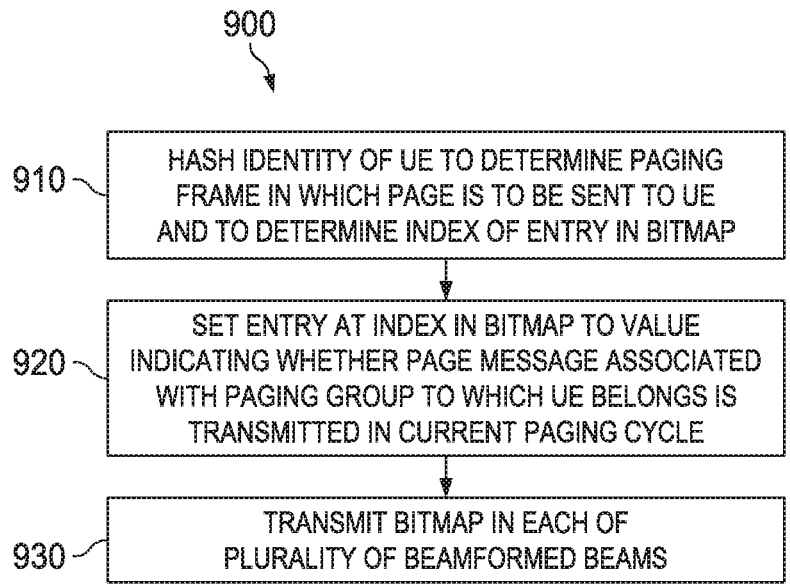
FIG. 9 is a flowchart of an embodiment method for paging notification.

FIG. 9 is a flowchart of an embodiment method 900 for paging notification. At block 910, an identity of a UE is hashed to determine a paging frame in which a page is to be sent to the UE and to determine an index of an entry in a bitmap. At block 920, the entry at the index in the bitmap is set to a value indicating whether a page message associated with a paging group to which the UE belongs is transmitted in a current paging cycle. At block 930, the bitmap is transmitted in each of a plurality of beamformed beams. The beams are transmitted in a sweeping pattern such that at least one beam is transmitted in every portion of a coverage area of a component transmitting the beams and such that each of the beams is transmitted at least once during the paging frame.

Figure 10:
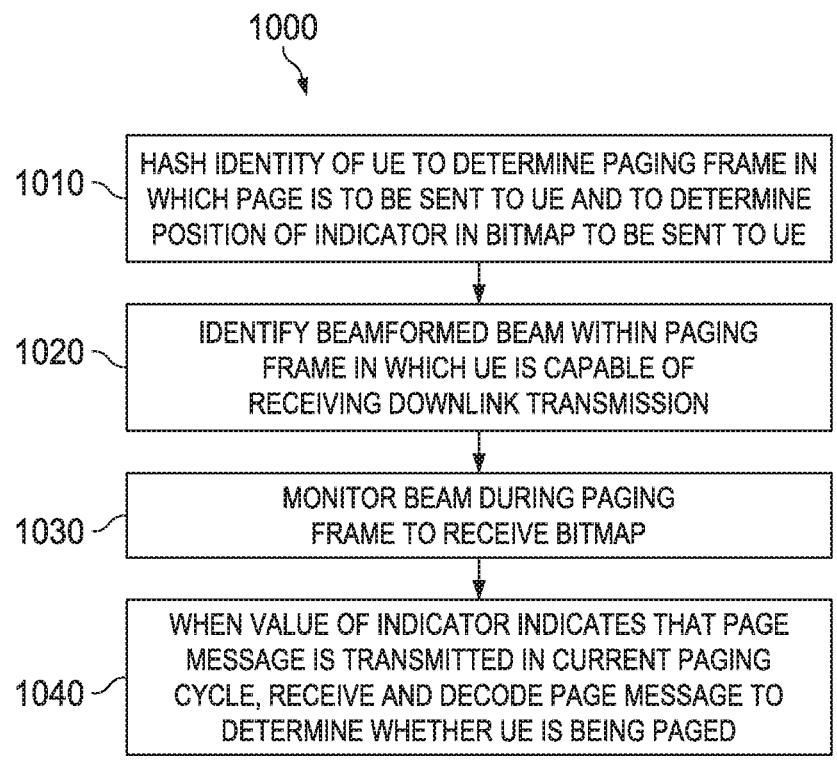
FIG. 10 is a flowchart of an embodiment method for paging monitoring.

FIG. 10 is a flowchart of an embodiment method woo for paging monitoring. At block low, an identity of a UE is hashed to determine a paging frame in which a page is to be sent to the UE and to determine a position of an indicator in a bitmap to be sent to the UE. A value of the indicator indicates whether a page message associated with a paging group to which the UE belongs is transmitted in a current paging cycle. At block 1020, a beamformed beam within the paging frame in which the UE is capable of receiving a downlink transmission is identified. At block 1030, the beam is monitored during the paging frame to receive the bitmap. At block 1040, when the value of the indicator indicates that the page message is transmitted in the current paging cycle, the page message is received and decoded to determine whether the UE is being paged.

Figure 11:
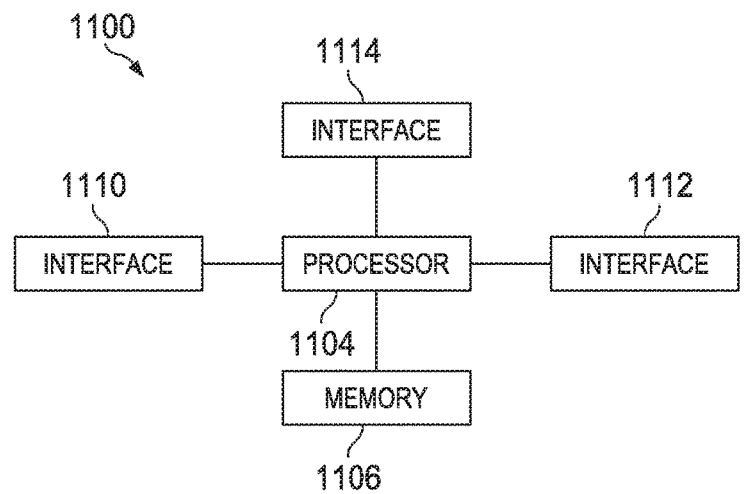
FIG. 11 illustrates a block diagram of an embodiment processing system for performing methods described herein.

FIG. 11 illustrates a block diagram of an embodiment processing system 1100 for performing methods described herein, which may be installed in a host device. As shown, the processing system 1100 includes a processor 1104, a memory 1106, and interfaces 1110-1114, which may (or may not) be arranged as shown in the figure. The processor 1104 may be any component or collection of components adapted to perform computations and/or other processing related tasks, and the memory 1106 may be any component or collection of components adapted to store programming and/or instructions for execution by the processor 1104. In an embodiment, the memory 1106 includes a non-transitory computer readable medium. The interfaces 1110, 1112, 1114 may be any component or collection of components that allow the processing system 1100 to communicate with other devices/components and/or a user. For example, one or more of the interfaces 1110, 1112, 1114 may be adapted to communicate data, control, or management messages from the processor 1104 to applications installed on the host device and/or a remote device. As another example, one or more of the interfaces 1110, 1112, 1114 may be adapted to allow a user or user device (e.g., personal computer (PC), etc.) to interact/communicate with the processing system 1100. The processing system 1100 may include additional components not depicted in the figure, such as long term storage (e.g., non-volatile memory, etc.).

In some embodiments, the processing system 1100 is included in a network device that is accessing, or part otherwise of, a telecommunications network. In one example, the processing system 1100 is in a network-side device in a wireless or wireline telecommunications network, such as a base station, a relay station, a scheduler, a controller, a gateway, a router, an applications server, or any other device in the telecommunications network. In other embodiments, the processing system 1100 is in a user-side device accessing a wireless or wireline telecommunications network, such as a mobile station, a user equipment (UE), a personal computer (PC), a tablet, a wearable communications device (e.g., a smartwatch, etc.), or any other device adapted to access a telecommunications network.

Figure 12:
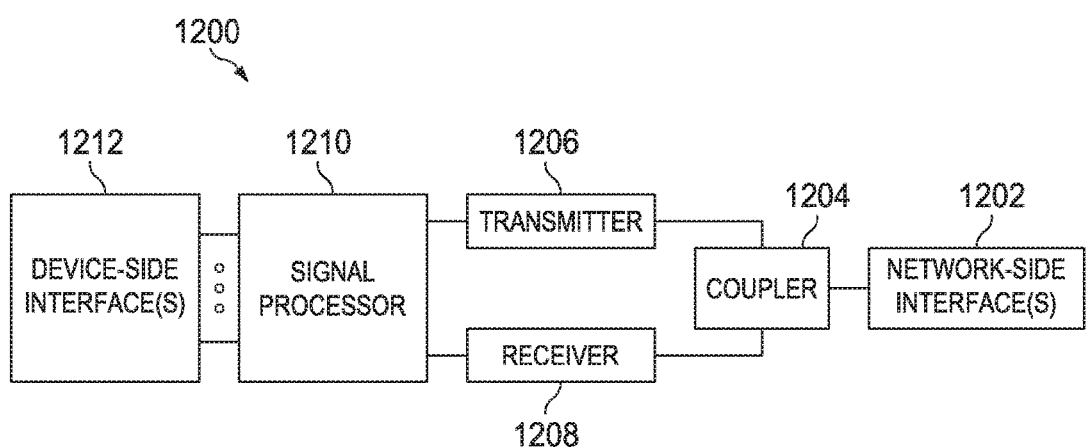
FIG. 12 illustrates a block diagram of a transceiver adapted to transmit and receive signaling over a telecommunications network.

In some embodiments, one or more of the interfaces 1110, 1112, 1114 connects the processing system 1100 to a transceiver adapted to transmit and receive signaling over the telecommunications network. FIG. 12 illustrates a block diagram of a transceiver 1200 adapted to transmit and receive signaling over a telecommunications network. The transceiver 1200 may be installed in a host device. As shown, the transceiver 1200 comprises a network-side interface 1202, a coupler 1204, a transmitter 1206, a receiver 1208, a signal processor 1210, and a device-side interface 1212. The network-side interface 1202 may include any component or collection of components adapted to transmit or receive signaling over a wireless or wireline telecommunications network. The coupler 1204 may include any component or collection of components adapted to facilitate bi-directional communication over the network-side interface 1202. The transmitter 1206 may include any component or collection of components (e.g., up-converter, power amplifier, etc.) adapted to convert a baseband signal into a modulated carrier signal suitable for transmission over the network-side interface 1202. The receiver 1208 may include any component or collection of components (e.g., down-converter, low noise amplifier, etc.) adapted to convert a carrier signal received over the network-side interface 1202 into a baseband signal. The signal processor 1210 may include any component or collection of components adapted to convert a baseband signal into a data signal suitable for communication over the device-side interface(s) 1212, or vice-versa. The device-side interface(s) 1212 may include any component or collection of components adapted to communicate data-signals between the signal processor 1210 and components within the host device (e.g., the processing system 1100, local area network (LAN) ports, etc.).

The transceiver 1200 may transmit and receive signaling over any type of communications medium. In some embodiments, the transceiver 1200 transmits and receives signaling over a wireless medium. For example, the transceiver 1200 may be a wireless transceiver adapted to communicate in accordance with a wireless telecommunications protocol, such as a cellular protocol (e.g., long-term evolution (LTE), etc.), a wireless local area network (WLAN) protocol (e.g., Wi-Fi, etc.), or any other type of wireless protocol (e.g., Bluetooth, near field communication (NFC), etc.). In such embodiments, the network-side interface 1202 comprises one or more antenna/radiating elements. For example, the network-side interface 1202 may include a single antenna, multiple separate antennas, or a multi-antenna array configured for multi-layer communication, e.g., single input multiple output (SIMO), multiple input single output (MISO), multiple input multiple output (MIMO), etc. In other embodiments, the transceiver 1200 transmits and receives signaling over a wireline medium, e.g., twisted-pair cable, coaxial cable, optical fiber, etc. Specific processing systems and/or transceivers may utilize all of the components shown, or only a subset of the components, and levels of integration may vary from device to device.

It should be appreciated that one or more steps of the embodiment methods provided herein may be performed by corresponding units or modules. For example, a signal may be transmitted by a transmitting unit or a transmitting module. A signal may be received by a receiving unit or a receiving module. A signal may be processed by a processing unit or a processing module. Other steps may be performed by a hashing unit/module, a setting unit/module, an identifying unit/module, a monitoring unit/module, and/or a decoding unit/module. The respective units/modules may be hardware, software, or a combination thereof. For instance, one or more of the units/modules may be an integrated circuit, such as field programmable gate arrays (FPGAs) or application-specific integrated circuits (ASICs).

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A method for paging monitoring implemented by a user equipment (UE), the method comprising:
hashing an identity of the UE to determine a paging frame in which a page is to be sent to the UE and to determine a position of an indicator in a bitmap to be sent to the UE, wherein a value of the indicator indicates whether a page message associated with a paging group to which the UE belongs is transmitted in a current paging cycle;
selecting a first downlink beamformed beam from a plurality of beams within the determined paging frame, wherein the plurality of beams are beams of a sweeping pattern of a transmit/receive point, wherein each beam of the plurality of beams includes the bitmap, and wherein each beam of the beams is transmitted at least once during the paging frame;
receiving the bitmap from the first downlink beamformed beam;
determining that the value of the indicator indicates that the page message is transmitted in the current paging cycle; and
based on the determining, receiving and decoding the page message to determine whether the UE is being paged.

2. The method of claim 1, wherein a number of entries in the bitmap is equal to a number of paging groups in the paging frame.

3. The method of claim 1, wherein a number of paging transmission time intervals (TTIs) the UE is specified to receive is variable.

4. The method of claim 1, wherein at least one paging TTI is transmitted in each of the plurality of beams, and wherein the bitmap is transmitted in each paging TTI.

5. The method of claim 4, wherein exactly one paging TTI is transmitted in each of the plurality of beams.

6. The method of claim 4, wherein a number of paging TTIs transmitted is part of a paging configuration.

7. The method of claim 1, wherein the UE listens to enough paging TTIs to reliably receive the bitmap.

8. The method of claim 1, wherein hashing further comprises determining a paging TTI within a plurality of paging TTIs in which the bitmap is to be received.

9. The method of claim 1, further comprising determining, by the UE, a configuration of paging TTIs for the first downlink beamformed beam.

10. A user equipment (UE) comprising:
a processor; and
a non-transitory computer readable storage medium storing programming for execution by the processor, the programming including instructions to:
hash an identity of the UE to determine a paging frame in which a page is to be sent to the UE and to determine a position of an indicator in a bitmap to be sent to the UE, wherein a value of the indicator indicates whether a page message associated with a paging group to which the UE belongs is transmitted in a current paging cycle;
select a first downlink beamformed beam from a plurality of beams within the determined paging frame, wherein the plurality of beams are beams of a sweeping pattern of a transmit/receive point, wherein each beam of the plurality of beams includes the bitmap, and wherein each beam of the beams is transmitted at least once during the paging frame;
receive the bitmap from the first downlink beamformed beam; and
determine that the value of the indicator indicates that the page message is transmitted in the current paging cycle and, based thereon, receive and decode the page message to determine whether the UE is being paged.

11. The UE of claim 10, wherein a number of entries in the bitmap is equal to a number of paging groups in the paging frame.

12. The UE of claim 10, wherein a number of paging transmission time intervals (TTIs) the UE is specified to receive is variable.

13. The UE of claim 10, wherein at least one paging TTI is transmitted in each of the plurality of beams, and wherein the bitmap is transmitted in each paging TTI.

14. The UE of claim 13, wherein exactly one paging TTI is transmitted in each of the plurality of beams.

15. The UE of claim 13, wherein a number of paging TTIs transmitted is part of a paging configuration.

16. The UE of claim 10, wherein the programming further includes instructions for the UE to listen to enough paging TTIs to reliably receive the bitmap.

17. The UE of claim 10, wherein the programming further includes instructions to hash the identity of the UE to determine a paging TTI within a plurality of paging TTIs in which the bitmap is to be received.

18. The UE of claim 10, wherein the programming further includes an instruction to determine a configuration of paging TTIs for the first downlink beamformed beam.

19. A communication device in a user equipment (UE) comprising:
a processor; and
an interface circuit configured to receive codes and transfer the codes to the processor, wherein the processor is configured to process the codes by:
hashing an identity of the UE to determine a paging frame in which a page is to be sent to the UE and to determine a position of an indicator in a bitmap to be sent to the UE, wherein a value of the indicator indicates whether a page message associated with a paging group to which the UE belongs is transmitted in a current paging cycle;
selecting a first downlink beamformed beam from a plurality of beams within the determined paging frame, wherein the plurality of beams are beams of a sweeping pattern of a transmit/receive point, wherein each beam of the plurality of beams includes the bitmap, and wherein each beam of the beams is transmitted at least once during the paging frame;
receiving the bitmap from the first downlink beamformed beam;
determining that the value of the indicator indicates that the page message is transmitted in the current paging cycle; and
based on the determining, receiving and decoding the page message to determine whether the UE is being paged.

20. The communication device of claim 19, wherein a number of entries in the bitmap is equal to a number of paging groups in the paging frame.

* * * * *